United States Patent
Das et al.

(10) Patent No.: US 9,479,896 B2
(45) Date of Patent: Oct. 25, 2016

(54) SMALL CELL ACTIVATION CONTROL OF PORTABLE MULTI-PURPOSE WIRELESS DEVICE

(71) Applicant: QUALCOMM Incorporated, San Diego, CA (US)

(72) Inventors: Soumya Das, San Diego, CA (US); Edwin Chongwoo Park, San Diego, CA (US); Bongyong Song, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 221 days.

(21) Appl. No.: 14/271,147

(22) Filed: May 6, 2014

(65) Prior Publication Data

US 2015/0327043 A1 Nov. 12, 2015

(51) Int. Cl.

| | |
|---|---|
| H04W 4/02 | (2009.01) |
| H04W 64/00 | (2009.01) |
| H04W 52/02 | (2009.01) |
| H04W 84/18 | (2009.01) |
| H04W 84/04 | (2009.01) |
| H04W 88/04 | (2009.01) |

(Continued)

(52) U.S. Cl.
CPC .............. *H04W 4/02* (2013.01); *H04W 4/021* (2013.01); *H04W 4/023* (2013.01); *H04W 52/0206* (2013.01); *H04W 64/003* (2013.01); *H04W 8/245* (2013.01); *H04W 84/045* (2013.01); *H04W 84/18* (2013.01); *H04W 88/04* (2013.01); *H04W 88/16* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,565,710 B2 | 10/2013 | Mirzaei et al. | |
| 2004/0198375 A1* | 10/2004 | Schwengler | G01S 5/0054 455/456.1 |

(Continued)

FOREIGN PATENT DOCUMENTS

| | | |
|---|---|---|
| EP | 2416609 A1 | 2/2012 |
| EP | 2584843 A1 | 4/2013 |
| WO | 2013060384 A1 | 5/2013 |

OTHER PUBLICATIONS

International Search Report and Written Opinion—PCT/US2015/026631—ISA/EPO—Jul. 16, 2015.

(Continued)

*Primary Examiner* — Charles Appiah
*Assistant Examiner* — Margaret G Mastrodonato
(74) *Attorney, Agent, or Firm* — Arent Fox LLP (57) ABSTRACT

In a network node, wireless device, or both, a method for controlling activation or deactivation of a small cell activity of a portable multi-purpose wireless device in a wireless communications network may include determining a geographic location of a portable multi-purpose wireless device. The device may be capable of two or more different states of small cell activity, including an activated state, a deactivated state, or a latent state. The method may include controlling a current one of the two or more different states of the small-cell capability of the portable multi-purpose wireless device, based at least in part on the geographic location. The network node, the wireless device, or both may activate or deactivate the small cell activity, or place it into a latent state, based on additional factors. In addition to its small cell capabilities, the wireless device may perform user function unrelated to the wireless network.

30 Claims, 8 Drawing Sheets

(51) Int. Cl.
*H04W 88/16* (2009.01)
*H04W 8/24* (2009.01)

(56) References Cited

U.S. PATENT DOCUMENTS

| | | | |
|---|---|---|---|
| 2006/0264214 A1* | 11/2006 | Stanwood | H04W 84/20 455/433 |
| 2009/0285143 A1 | 11/2009 | Kwun et al. | |
| 2009/0312017 A1* | 12/2009 | Grob | H04W 36/04 455/434 |
| 2010/0169498 A1 | 7/2010 | Palanki et al. | |
| 2011/0312333 A1* | 12/2011 | I'Anson | H04W 8/245 455/456.1 |
| 2012/0056184 A1 | 3/2012 | Park | |
| 2013/0148558 A1 | 6/2013 | Malladi et al. | |

OTHER PUBLICATIONS

Kim R.Y., et al., "WiMAX Femtocell: Requirements, Challenges, and Solutions," IEEE Communications Magazine, Sep. 2009, pp. 84-91.

* cited by examiner

SMALL CELL ACTIVATION CONTROL OF PORTABLE MULTI-PURPOSE WIRELESS DEVICE

BACKGROUND

Aspects of the present disclosure relate generally to wireless communication systems, and more particularly, to apparatus, systems, and methods for controlling features of small cells.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Uplink Packet Access (HSUPA) is a data service offered on the uplink of UMTS networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. These improvements may be applicable to other multi-access technologies and the telecommunication standards that employ these technologies.

In heterogeneous cellular wireless systems including base stations of widely varying power, base stations may be broadly categorized as "macro" cells or small cells. Femto cells and pico cells are examples of small cells. As used herein, a small cell means a cell characterized by having a transmit power substantially less than each macro cell in the network with the small cell, for example low-power access nodes such as defined in 3GPP Technical Report (T.R.) 36.932 V12.1.0, Section 4 ("Introduction").

Small cells may be deployed in an ad hoc manner, but are generally not portable. That is, the location where a small cell is initialized generally remains the same or static for long periods of time. Portable access terminals may be used as relay devices, but a relay device does not provide the full functionality of a small cell. Increasingly, however, access terminals are configured with wireless hardware that may enhance their suitability for operating as small cells, while also retaining functionality for other uses, for example as a wireless access terminal, computer terminal, stand-alone computer, home entertainment appliance, or portable server. It may be desirable, therefore, to extend small cell functionality to new configurations, devices and equipment, and to provide news methods for controlling operation of small cells in such new configurations or equipment.

SUMMARY

Methods, apparatus and systems for controlling activation or deactivation of a small cell capability of a portable multi-purpose wireless device of a wireless communications system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a portable computer terminal is configured with user functions that may be unrelated to the wireless communication network, and with small cell functions enabling operation of the portable terminal as a small cell of the wireless communication network. The terminal's small cell functions can be activated and de-activated in response to transient network conditions in its vicinity, by one or more nodes of the wireless communication network. The computer terminal need not be a special-purpose device configured as a small cell of the network, but may have substantial other, unrelated user functions. For example, a notebook computer or laptop computer may be configured as a general-purpose computer for operating user-selected applications, while also including hardware and software enabling the computer to operate as a small cell under control of the wireless communication network, optionally while also being used to run user-selected applications.

An incentive for this dual-use configuration may be to enable greater penetration and distribution of small cells within a wireless communication network, without requiring a user base to purchase and operate dedicated small cells. For example, a system operator may offer free or subsidized portable computers to the general public in a given geographic area, in exchange for an agreement to allow use and operation of the portable computers as portable small cells. The users may be free to use the portable computers for a wide range of user-selected applications, which may be completely unrelated to operation or use of the wireless communication network. Thus, a system operator may cause a population of portable small cells to enter into use within a geographic area. The portable small cells can be activated or deactivated by the system operator as needed to ensure connectivity for the system's subscribers.

As used herein, a small cell means a cell characterized by having a transmit power substantially less than each macro cell in the network with the small cell, for example low-power access points such as defined in 3GPP Technical Report (T.R.) 36.932 section 4. In addition, portable multi-purpose device having a small cell capability which can be selectively activated and deactivated by a system operator may be referred to herein as a portable multi-purpose wireless device.

Accordingly, the present disclosure also concerns methods for controlling activation or deactivation of a small cell capability of a portable multi-purpose wireless device in a wireless communications network. In an aspect, a method may include determining a geographic location of a portable multi-purpose wireless device capable of two or more different states of small cell activity. The different states may include, for example, an active state, an inactive (or deactivated) stated, and a latent or "waiting" state. The method may further include controlling a current one of the two or more different states of the small-cell capability of the portable multi-purpose wireless device, based at least in part on the geographic location.

In an aspect of the method, controlling the current one of the two or more different states may include placing the small-cell capability in an active state wherein the wireless device operates as a small cell. In the alternative, or in addition, controlling the current one of the two or more different states may include placing the small-cell capability in an inactive state wherein the wireless device does not perform any small cell function. In another alternative, controlling the current one of the two or more different states may include placing the small-cell capability in a latent state wherein the wireless device does not operate as a small cell and waits for an activation signal. When the wireless device is in the latent state, the method may include at least one of: sparsely transmitting an overhead signal for detection by a mobile entity or for reporting to the wireless communication network, advertising its presence using OOB (Out-Of-Bounds) signaling, listening to OOB signaling, or listening for an activation request.

In other aspects of the method, controlling the current one of the two or more different states may be further based on whether the wireless device is located in a defined home region. Determining whether the wireless device is located in a defined home region may be based on least one of a macro cell neighborhood detected by the wireless device, or on Global Positioning System (GPS) coordinates detected by the wireless device.

In other aspects of the method, controlling the current one of the two or more different states may be further based on at least one of demand or load factors of the wireless communication network. In another alternative, or in addition, controlling the current one of the two or more different states may be further based on one or more locations of at least one additional portable multi-purpose wireless device capable of two or more different states of small cell activity.

In another alternative, or in addition, controlling the current one of the two or more different states may be further based on at least one power source status of the wireless device and at least one additional portable multi-purpose wireless device capable of two or more different states of small cell activity. For example, if two or more devices are available to act as a small cell in an area, priority may be given to the device with a more reliable or replenishable power source (e.g., grid power). In another alternative, or in addition, controlling the current one of the two or more different states may be further based on at least one of an available radio access technology, backhaul availability, or backhaul quality of the wireless device and at least one additional portable multi-purpose wireless device capable of two or more different states of small cell activity.

In other aspects, controlling the current one of the two or more different states may be further based on at least one wireless capability of at least one mobile entity within radio range of the wireless device. For example, a decision may be made to activate the small cell capability if the radio access technology provided would be appropriate, or more appropriate than alternatives, for the mobile entity. In the alternative, or in addition, controlling the current one of the two or more different states may be further based on uplink signaling from one or more mobile entity. In an aspect, the uplink signaling may include at least one of non-decoded uplink traffic, or a request to activate the small-cell capability of the wireless device.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a network entity wireless communication network, for example, a portable computer terminal having a first set of functions unrelated to the wireless communication network, and a second set of functions enabling its operation as a small cell capable of the wireless communication network, which can be activated and de-activated in response to transient network conditions in its vicinity. In some aspects, one or more other network entities of the wireless communication network may operate interactively with a portable computer terminal to perform aspects of the technology as described herein. Similarly, an article of manufacture may be provided, including a computer-readable storage medium holding encoded instructions, which when executed by a processor, cause a network entity to perform the methods and aspects of the methods as summarized above.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Present and anticipated future needs for high bandwidth to mobile terminals may require a much higher density of small cells in urban environments than is presently the case. The required density (e.g., 20% of households in a given area, where 10× spectrum is available) may exceed what is easily attainable using conventional distribution models for implementing small cell installations. To meet challenging penetration goals for user-deployed small cells, alternatives may include configuring some portion of mobile entities (UEs) to operate as small cells under certain conditions. A drawback to this approach may include power limitations, as mobile entities may be infrequently connected to grid power, or other resource constraints.

Figure 1:
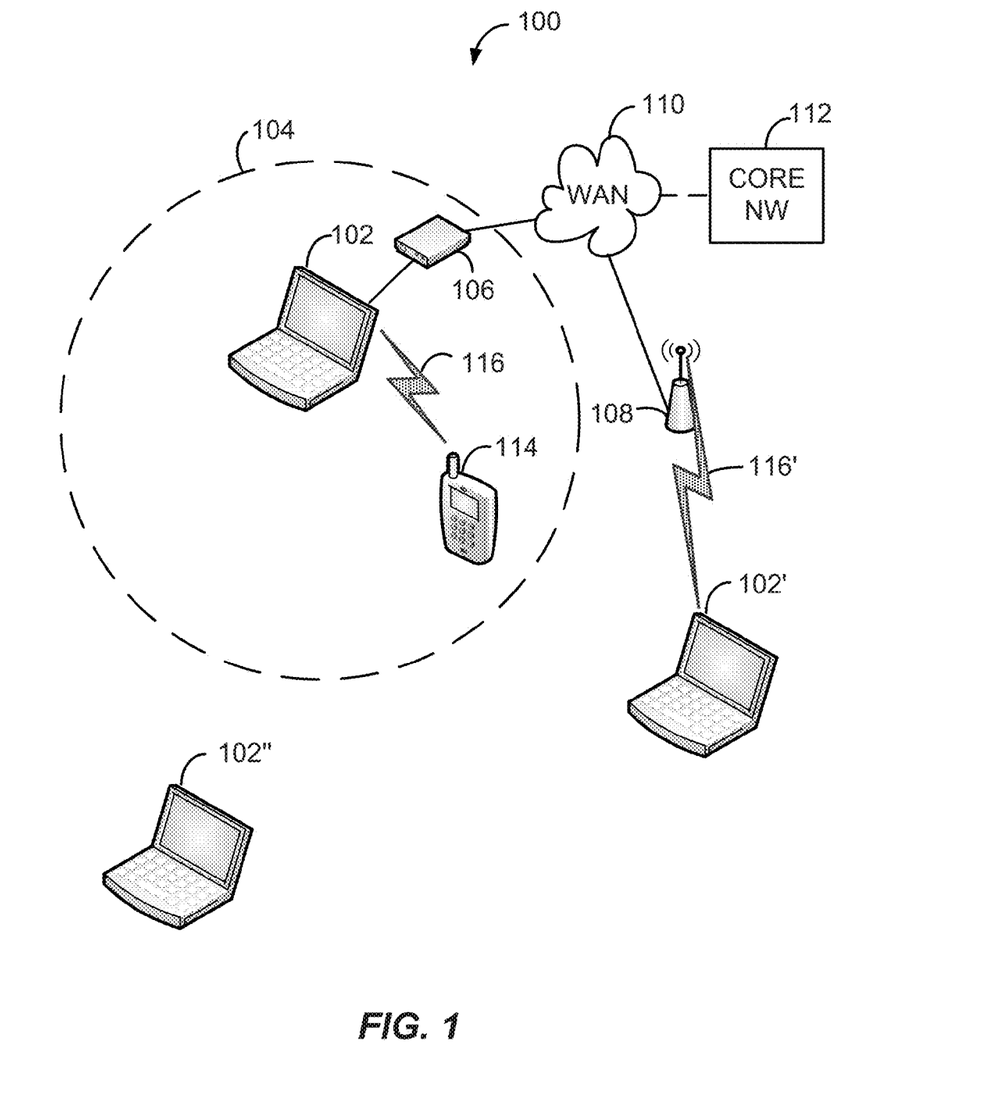
FIG. 1 is a block diagram illustrating aspects of activating or deactivating a small cell capability of a portable multi-purpose wireless device, in a wireless communications system.

Referring to FIG. 1, showing a system 100 including a core network 112, wide area network (WAN) 110, and unconventional computing terminals 102. Unconventional computing terminals 102 may be terminals that are not traditionally used as UEs, but that may more frequently be connected to grid power or more robust battery sources. In system 100, unconventional computing terminals 102 may be configured to operate as small cells on an as-needed or other conditional basis. Such unconventional terminals may include, for example, notebook, laptop, or desktop computers with backhaul and wireless capabilities, or appliances such as smart televisions or home security systems. These terminals 102 may connect to a WAN 110 via a modem 106 or the like when in a home location, for a backhaul. A backhaul such as via WAN 110 may include wireless links, wired links, or some combination of wired and wireless links. As such, the terminal 102 may readily operate as a small cell for one or more mobile entities 114 in its vicinity or home region 104, via a wireless link 116. When away from the home region 104, a terminal 102' may connect to the WAN 110 via a different wireless link 116' and wireless hotspot 108 or cell, or may be unconnected as shown at 102".

In one distribution model, for example, portable devices such as smart phones, Internet appliances for televisions or the like, media players, smart appliances, laptop computers, tablet computers, or other devices or systems with the desired small cell capabilities may be distributed free of charge or at a subsidized rate to users, in exchange for an agreement permitting their use as small cells when needed by the network operator. Such terminals 102 need not be equipped to function as user terminals in the wireless network that they serve as small cells. They may be used for different and unrelated functions, for example as general purpose computers, entertainment appliances, or home security appliances, by the users who install them in their homes or businesses. The terminals 102 may be highly portable or merely transportable. Such devices may be referred to herein as "portable multi-function wireless devices with small cell capability," or as "portable small cells" for brevity. In an aspect, the small cell capability includes at least an active ("on") state and an inactive or deactivated ("off") state. Either of the inactive state or deactivated state may be realized when the device is otherwise powered on and operating in its unrelated function.

Whatever the type of portable multi-function wireless devices with small cell capability, system design challenges may include determining when to place the devices in a small cell active state, and what operating conditions to apply. Accordingly, systems and methods are discussed herein that can deal with various challenges presented by portable small cells. For example, a system can determine whether a portable small cell should be in an active state at all time when it is stationary and powered on, or only some of the time. To avoid interference with other cells or depletion of power, it may be advantageous to avoid activating portable small cells except when needed. As another example, the system can determine whether the portable small cell should be activated when it is powered on, if it is moved out of its designated home area 104. As yet another example, the system can determine how portable small cells should be activated or deactivated. As a further example, if multiple portable small cells are available and some are not needed to handle network load, the system can determine which portable small cells should be activated and which should be inactivated. Moreover, when particular portable small cells are activated, the system can determine which radio access technology (RAT) or frequency band the portable small cell should use.

Figure 2:
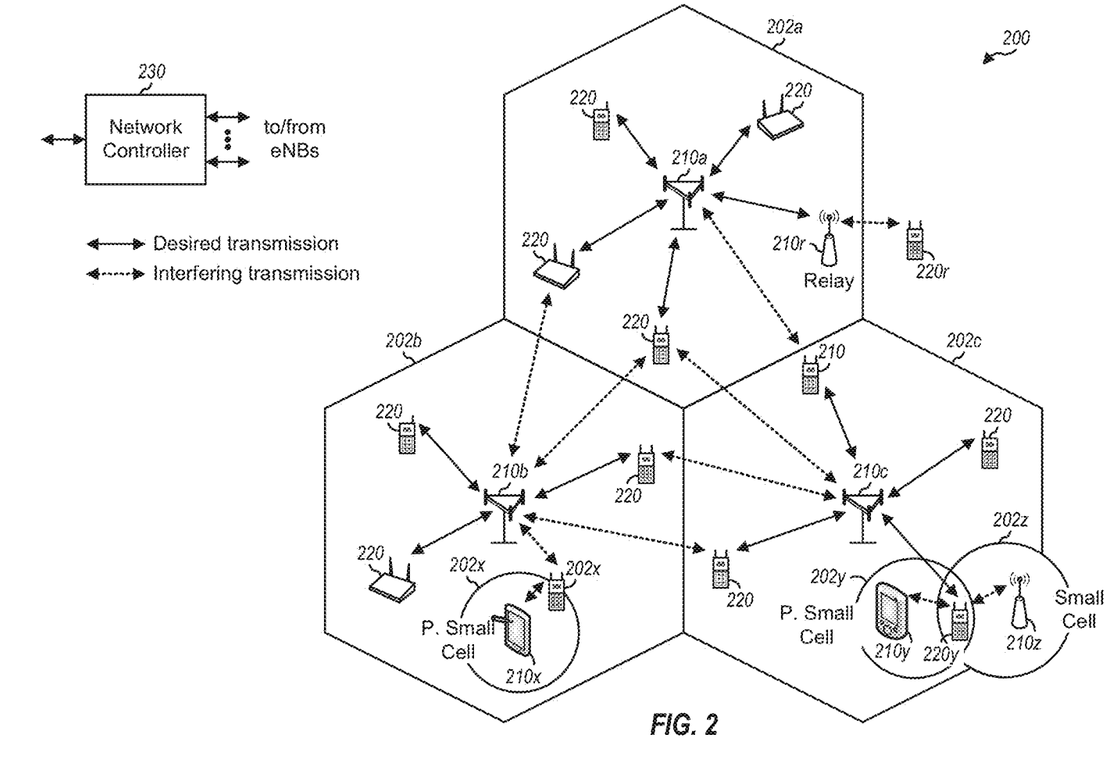
FIG. 2 is a schematic diagram illustrating aspects of a wireless communication system in which activation or deactivation of a portable multi-purpose wireless device may be performed.

Before describing the methods and apparatus for controlling activation or deactivation of a small cell capability of a portable multi-purpose wireless device in a wireless communications network in more detail, an example of a context in which the present techniques may be practiced is helpful. FIG. 2 shows a wireless communication network 200, which may be an LTE network. The wireless network 200 may include a number of eNBs 210 and other network entities. An eNB may be a station that communicates with the UEs. As used herein, an eNB may also be referred to as a base station, a Node B, an access point, or other term, and generally includes small cell base stations as well as macro base stations. Each eNB 210a, 210b, 210c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a femto cell, portable small cell, and/or other types of cell. A macro cell may cover a relatively large geographic area (e.g., several kilometers in radius) and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a femto cell may be referred to as a femto eNB or a home eNB (HeNB). An eNB for a portable small cell may be referred to as a portable small cell eNB. In the example shown in FIG. 1, the eNBs 210a, 210b and 210c may be macro eNBs for the macro cells 202a, 202b and 202c, respectively. The eNB 210x may be a portable small cell eNB for a small cell 202x, and the eNB 201y may be a portable small cell eNB for a small cell 202y. The eNB 210z may be femto eNB for the femto cells 202z. An eNB may support one or multiple (e.g., three) cells. The femto cell and portable small cells are examples of small cells. As used herein, a small cell means a cell characterized by having a transmit power substantially less than each macro cell in the network with the small cell, for example low-power access points such as defined in 3GPP Technical Report (T.R.) 36.932 section 4.

The wireless network 200 may also include relay stations 210r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 210r may communicate with the eNB 210a and a UE 220r in order to facilitate communication between the eNB 210a and the UE 220r. A relay station may also be referred to as a relay eNB, a relay, etc.

The wireless network 200 may be a heterogeneous network that includes eNBs of different types, e.g., macro eNBs, portable small cell eNBs, femto eNBs, relays, or other base stations. These different types of eNBs may have different transmit power levels, different coverage areas, and different impact on interference in the wireless network 200. For example, macro eNBs may have a high transmit power level (e.g., 5 to 20 Watts) whereas portable small cell eNBs, femto eNBs and relays may have a lower transmit power level (e.g., 0.1 to 2 Watts).

The wireless network 200 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 230 may couple to a set of eNBs and provide coordination and control for these eNBs. The network controller 230 may communicate with the eNBs 210 via a backhaul. The eNBs 210 may also communicate with one another, e.g., directly or indirectly via wireless or wireline backhaul. The eNBs may include, for example, a conventional small cell eNB 210y and a number of portable small cell eNB's 201y, 210z.

The UEs 220 may be dispersed throughout the wireless network 100, and each UE may be stationary or mobile. A UE may also be referred to as a terminal, a mobile station, a subscriber unit, a station, a smart phone, etc. A UE may be a cellular phone, a personal digital assistant (PDA), a wireless modem, a wireless communication device, a handheld device, a laptop computer, a notebook computer, a cordless phone, a wireless local loop (WLL) station, an educational device, or another mobile entity. A UE may be able to communicate with macro eNBs, portable small cell eNBs, femto eNBs, relays, or other network entities. In FIG. 2, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively. In LTE, system bandwidth may be 1.4, 3, 5, 10, 15, or 20 MHz with a number of resource blocks 6, 15, 25, 50, 75 and 100, respectively, and sub carriers numbering 72, 180, 300, 600, 900 and 1200, respectively.

Figure 3:
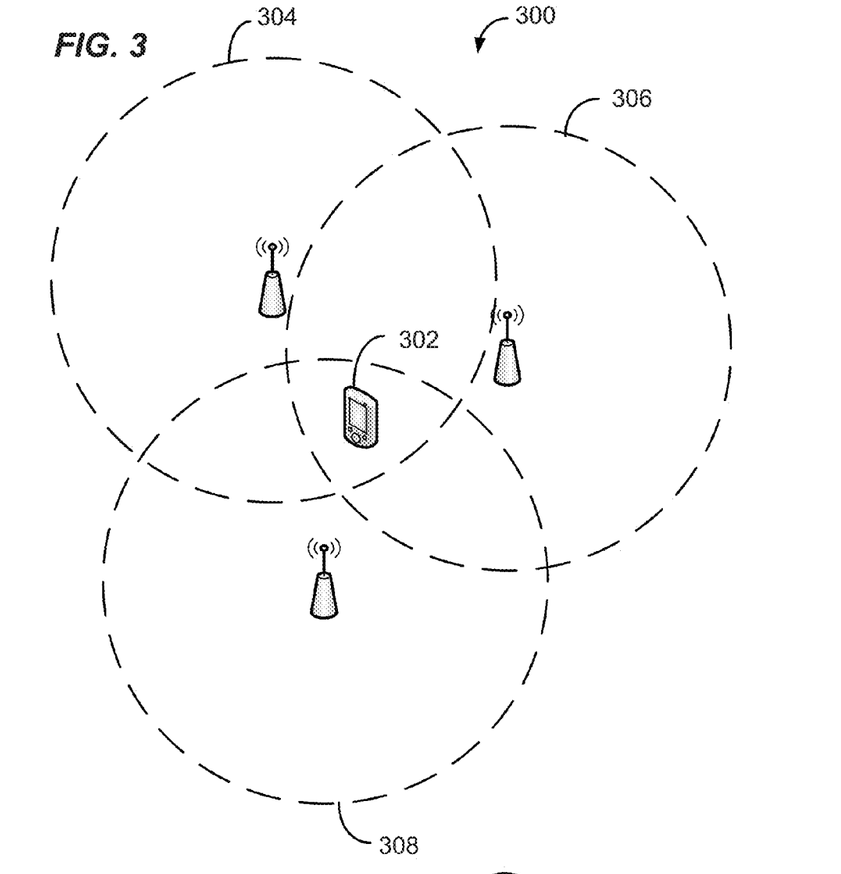
FIG. 3 is a schematic diagram illustrating geo-fencing.

It may be desirable to deactivate portable small cells that are not in a home neighborhood or home geographic area. To determine whether a portable small cell is in a home area, geo-fencing based on macro cell identifiers may be used. Geo-fencing may be better understood with respect to FIG. 3, showing an area 300 of a wireless communication network that include several macro cells 304, 306, 308. Each of the macro cells may be assigned a specific identifier. A portable small cell 302 may maintain a stored fingerprint of its home area, based on cell identifiers of neighboring macro cells 304, 306, 308 on each applicable RAT or frequency band. The portable small cell may be activated as a small cell whenever it detects that it is within its fingerprinted area, and deactivated if it detects that it has moved out of its fingerprinted area. The fingerprinted area may be defined in various ways, such as the union of area 304, 306, 308, the intersection of these areas, or by some other definition. In an alternative, or in addition, the portable small cell 302 may use detected Global Positioning System (GPS) coordinates to determine whether it is in a home area. Geofencing may also be implemented for various types of portable small cells, for example, pico cells or femto cells, by clumping the small cell into the macro cell for this application. Geofencing may similarly be implemented for stationary cells.

When in its home, a portable small cell may have access to broadband connectivity to a core network via WiFi or similar link. Outside of its home, if it is still within a desired geo-fence (for example, an operator-defined geo-fence designed to supply small cell capability in an under-served area), it may be configured as a relay eNB and provide connectivity to mobile entities if needed. Outside of its home and any indicated geo-fence, its small cell functionality may be deactivated. In other embodiments, geo-fences may be disregarded and the portable small cell may be activated whenever needed, wherever it happens to be.

A portable small cell may be activated or deactivated by an operator radio access node or other control node based on network load, geographic location, or other factors. For example, in some areas demand may be met by a first set of macro cells, conventional small cells and portable small cells. Additional portable small cells in the area may therefore be deactivated.

Activation control decisions may be performed in a centralized manner, by one or more control nodes for a region. In an alternative, control of activation may be performed in a self-organizing, distributed manner. In a centralized approach, a network entity may determine which portable small cells from a pool of available devices should be activated. The decision may be based on available power, location of mobile entities relative to different portable small cells, potential for interference with other cells, other factors, and/or any combination thereof. Portable small cells may be activated in a rotating manner to more evenly distribute use of resources over time, such as for example to preserve battery power. In addition, a centralized network entity may determine a RAT or frequency band for the portable small cell to operate in, depending on capabilities of mobile entities that will be served by the portable small cells.

In a hybrid of centralized and self-organizing approaches, the portable small cell may autonomously determine that it should activate or deactivate, based on determining whether it is located inside or outside of a geo-fence or fingerprint associated with its base/home location. The geo-fence/fingerprint may be defined as macro cell neighborhood or GPS coordinates. This could be based on the network/operator policy. The cellular network may determine whether or not to activate/deactivate a portable small cell based on network conditions (e.g., demand or load factors); current location of portable small cells, power availability state of portable small cells, presence of other proximate portable small cells and their states, small cell and proximate UE capabilities regarding radio access technology (RAT) support, band support, backhaul availability/quality or quality state of portable small cells; other criteria, and/or any combination thereof. In some embodiments, the portable small cell may activate itself or become a candidate (final decision may still be with network) in response to UL sensing i.e. detecting energy in UL exceeding a threshold, OOB signaling, and/or detecting a specific UE broadcast signal requesting activation of proximate portable small cells. In some cases, once a latent portable small cell detects nearby mobile entities by uplink sensing, it may transition to an active state based on mobile entity sensing measurements, using a distributed control method. In the alternative, the portable small cell may report uplink sensing measurements to a central network entity. The central network entity (e.g., RAN with or without help from CN) may determine whether the portable small cell should be activated based on the uplink sensing report.

In some embodiments, prior to activation, the portable small cell may operate in a latent state without advertising itself; i.e., it may listen only. While operating in the latent state, a portable small cell may await a signal to transition to an active state. As used herein, a portable small cell operating in the latent state may be referred to as a "latent cell". During this state, the portable small cell is neither activated nor deactivated. Instead, it may transmit overhead signals, such as, for example, Primary Synchronization Signals (PSS), Secondary Synchronization Signals (SSS), Common Reference Signal (CRS), a master information block (MIB) or system information block (SIB), at sparse intervals, meaning at a substantially reduced frequency compared to its active state. This allows nearby UEs to detect the presence of the small cells even when the portable small cell is in a latent state. Periodicity of overhead signaling may be reduced to manage interference from a large number of latent cells and to conserve resources. At a later time, based on the results of UL sensing, the portable small cell can change from the latent state to an active state (e.g., by activating itself or becoming a candidate for activation). For example, once a latent portable small cell receives an activation signal from a macro cell or conventional small cell, it may transition to an active state and operate as a small cell. As another example, a small cell in a latent state may advertise its presence using Out-Of-Band (OOB) signaling. In some embodiments, a portable small cell may be in communication with RAN and/or CN while operating in either a latent state or a deactivated state.

It should be appreciated that the distinction between latent, active, and inactive states relates to the small cell function of a small cell, and not to other uses of a dual-use device unrelated to small cell function. Whether in a latent, active, or inactive state, a dual-use small cell may continue to function normally for other uses, for example, as a user terminal or computing device, or may be disabled or not in use for other purposes. A dual-use small cell may be configured such that there is no relationship between its small cell state and its state for unrelated uses. In the alternative, a small cell may be configured so that there is some defined relationship between its small cell state and its state for unrelated uses. For example, a dual use small cell may be maintained in a latent or inactive state, generally at times when it is undergoing use for a different purpose, or when its level of use for the other purpose exceeds some threshold.

In an aspect, activation of a portable small cell may be wholly or partly triggered by one or more neighboring mobile entities, based on the mobile entities' bandwidth demands compared to system loads, quality of service (QoS) requirements, and the portable small cell's geographic location. For example, in areas where demand is met by macro cells and operational small cells, additional portable small cells may be deactivated or put into a latent state, in which it can detect uplink signals but does not emit downlink signals except for sparse overhead signaling.

In addition to uplink sensing, or in an alternative, the portable small cell may also listen for a signal from a mobile entity that indicates an inquiry concerning whether a small cell is available, or a demand for small cell service. For example, the portable small cell may listen for a UE request for activation of a nearby small cell, over OOB. The portable small cell may report such a signal to a network entity for centralized control, for example using WWAN or OOB, or may act on the signal according to a distributed control scheme. This listening and reporting may be performed while the portable small cell is in a latent state.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 4:
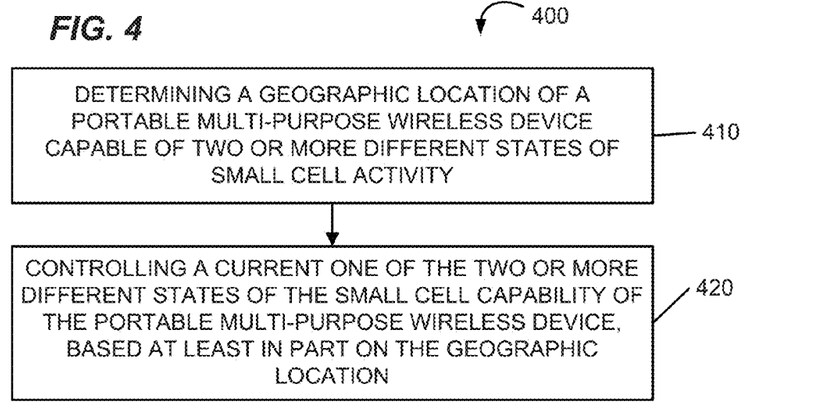
FIGS. 4-8 are flow charts illustrating aspects of methods for controlling activation or deactivation of a small cell capability of a portable multi-purpose wireless device in a wireless communications network.

FIG. 4 is a flow diagram summarizing aspects of a method 400, by one or more of a core network entity in communication with a wireless device or the wireless device, of a method for controlling activation or deactivation of a small cell capability of a portable multi-purpose wireless device in a wireless communications network. In an aspect, a method may include, at 410, determining a geographic location of a portable multi-purpose wireless device capable of two or more different states of small cell activity. The different states may include, for example, an active state, an inactive (or deactivated) stated, and a latent state. Determining the geographic location may be performed while the device is in a deactivated or latent state, using one or more operations as described elsewhere herein. When in a deactivated or latent state, the wireless device may perform functions unrelated to functioning as a terminal or small cell of the wireless communication network. In an aspect, the wireless device may lack any capability to function as a terminal in the wireless communication network. In such case, for example, it may be distributed to, used and transported by a user for unrelated uses. When the portable multi-purpose device is in the small cell activate state, functions unrelated to the small cell operator may or may not be functioning.

The method may further include, at 420, controlling a current one of the two or more different states of the small cell capability of the portable multi-purpose wireless device, based at least in part on the geographic location. For example, it may be determined to activate a deactivated or latent device as a small cell, if it is located in a "home" area and not if it is outside of the area. However, other factors may also be considered, as described herein, in addition to, or instead of, geographic location.

The method 400 may further include additional operations or execution of algorithms, for example, one or more of operations 500, 600, 700 or 800 illustrated in FIGS. 5-8. Any one of these operations may be included as part of method 400, without necessarily requiring other upstream or downstream operations to also be included. Operations are grouped into different figures merely for illustrative convenience, and useful applications of the concepts disclosed herein are not limited to the illustrated groupings.

Figure 5:
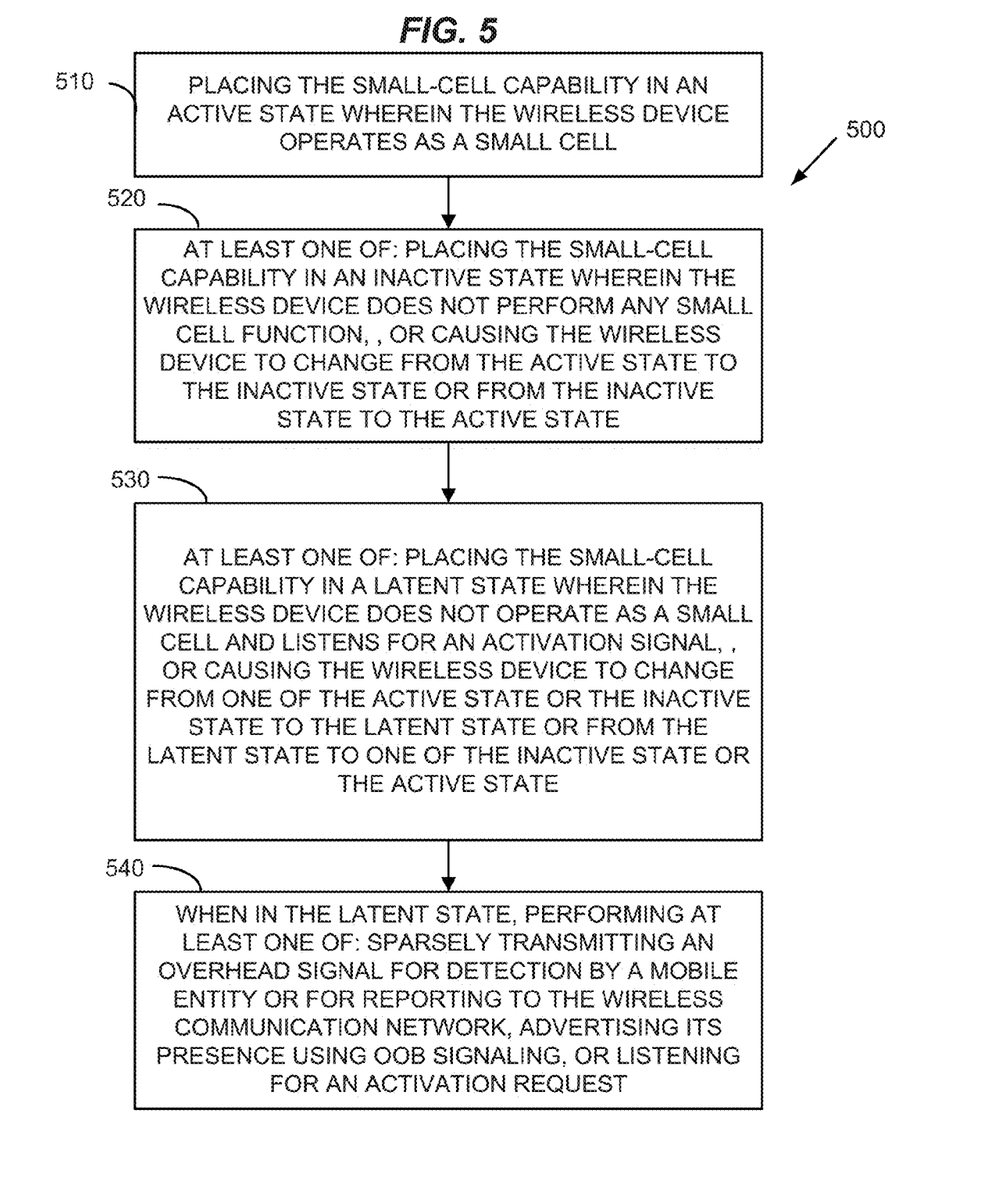

The method 400 may include one or more of the additional operations 500, shown in FIG. 5. In an aspect of the method 400, controlling the current one of the two or more different states may include, at 510, placing the small-cell capability in an active state wherein the wireless device operates as a small cell. In the alternative, or in addition, controlling the current one of the two or more different states may include, at 520, at least one of: placing the small-cell capability in an inactive state, also referred to herein as a deactivated state, wherein the wireless device does not perform any small cell function, or causing the wireless device to change from the active state to the inactive state or from the inactive state to the active state. In alternative aspects, the device may also be incapable of functioning as a wireless terminal of the network at all times; or may be capable of functioning as a terminal of the network. In another alternative, controlling the current one of the two or more different states may include, at 530, at least one of: placing the small-cell capability in a latent state wherein the wireless device does not operate as a small cell and waits (and listens) for an activation signal, or causing the wireless device to change from one of the active state or the inactive state to the latent state or from the latent state to one of the inactive state or the active state. When the wireless device is in the latent state, the method 400 may include, at 540, at least one of: sparsely transmitting an overhead signal for detection by a mobile entity or for reporting to the wireless communication network, advertising its presence using Out-Of-Band (OOB) signaling, or listening for an activation request. Overhead signals may include, for example, primary or secondary synchronization signals (PSS or SSS), common reference signals (CRS), a master information block (MIB) signal or system information block (SIB) signal. "Sparsely transmitting" means transmitting at a substantially lower than normal frequency or duty cycle for a small cell.

Figure 6:
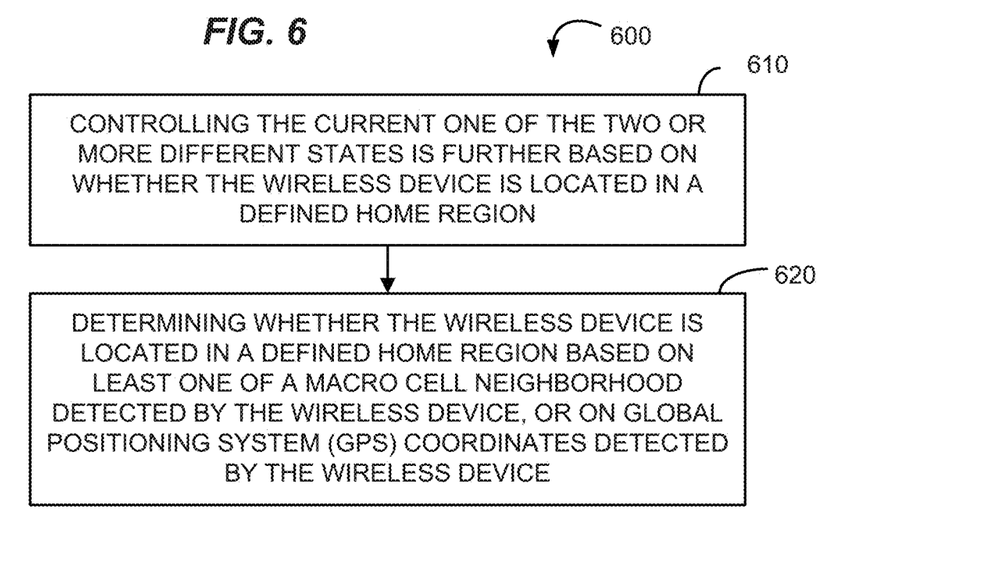

In other aspects, the method 400 may include one or more of the additional operations 600, shown in FIG. 6. The method 400 may further include, at 610, controlling the current one of the two or more different states further based on whether the wireless device is located in a defined home region. The concept of a home region is discussed in more detail in connection with FIG. 3. In an aspect of the method, determining whether the wireless device is located in a defined home region may be based, at 610, on least one of a macro cell neighborhood detected by the wireless device, or on Global Positioning System (GPS) coordinates detected by the wireless device.

Figure 7:
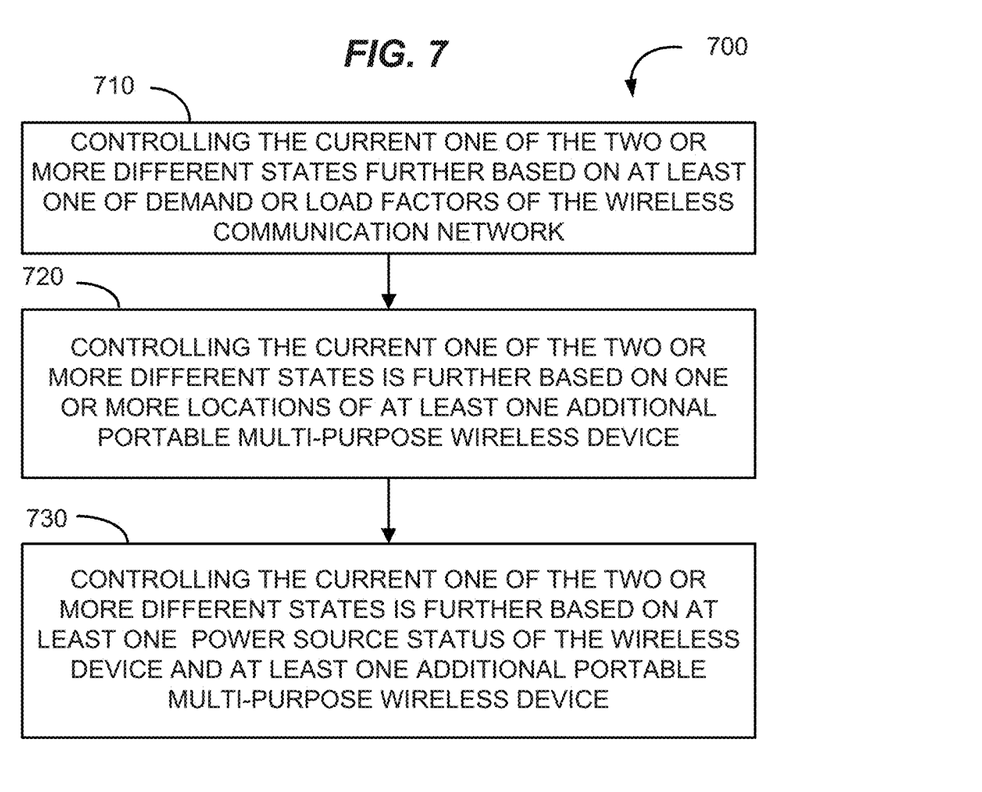

In other aspects, the method 400 may include one or more of the additional operations 700, shown in FIG. 7. The method 400 may include, at 710, controlling the current one of the two or more different states further based on at least one of demand or load factors of the wireless communication network. For example, the wireless device may be activated when nearby macro cell load factors are high or above a defined threshold, and deactivated or put into a latent state when nearby macro cell load factor are low, or below a defined threshold.

In another alternative, or in addition, controlling the current one of the two or more different states may be further based, at 720, on one or more locations of at least one additional portable multi-purpose wireless device capable of two or more different states of small cell activity. For example, a determination to activate may be made if there is no nearby active or preferable portable multi-function wireless device to handle a present or anticipated demand.

In another alternative, or in addition, controlling the current one of the two or more different states may be further based, at 730, on at least one of: power source status of the wireless device and at least one additional portable multi-purpose wireless device capable of two or more different states of small cell activity. For example, if two or more devices are available to act as a small cell in an area, priority may be given to the device with a more reliable or replenishable power source (e.g., grid power, solar power). As used herein, a "power source status" means a current status of a power source. A power source status may include, for example, a measured voltage across terminals of a battery, solar cell, or other power source, a ratio of the measured voltage to a baseline voltage, an indication of a connection to a power grid (e.g., an indication of whether or not the device is plugged into wall power), a power frequency, a measure of stability, or other quantitative or qualitative indication of a current power source state.

In another alternative, or in addition, controlling the current one of the two or more different states may be further based on at least one of an available radio access technology (RAT), backhaul availability, or backhaul quality of the wireless device and at least one additional portable multi-purpose wireless device capable of two or more different states of small cell activity. For example, preference may be given in an activation determination to a device with a more suitable or superior RAT or backhaul, wherein the more suitable or superior RAT may be determined as a function of the capabilities of the UEs that the small cell or group of small cells can serve. Similarly, a preferable band may be determined based on capabilities of the UEs that the small cell or group of small cells can serve.

Figure 8:
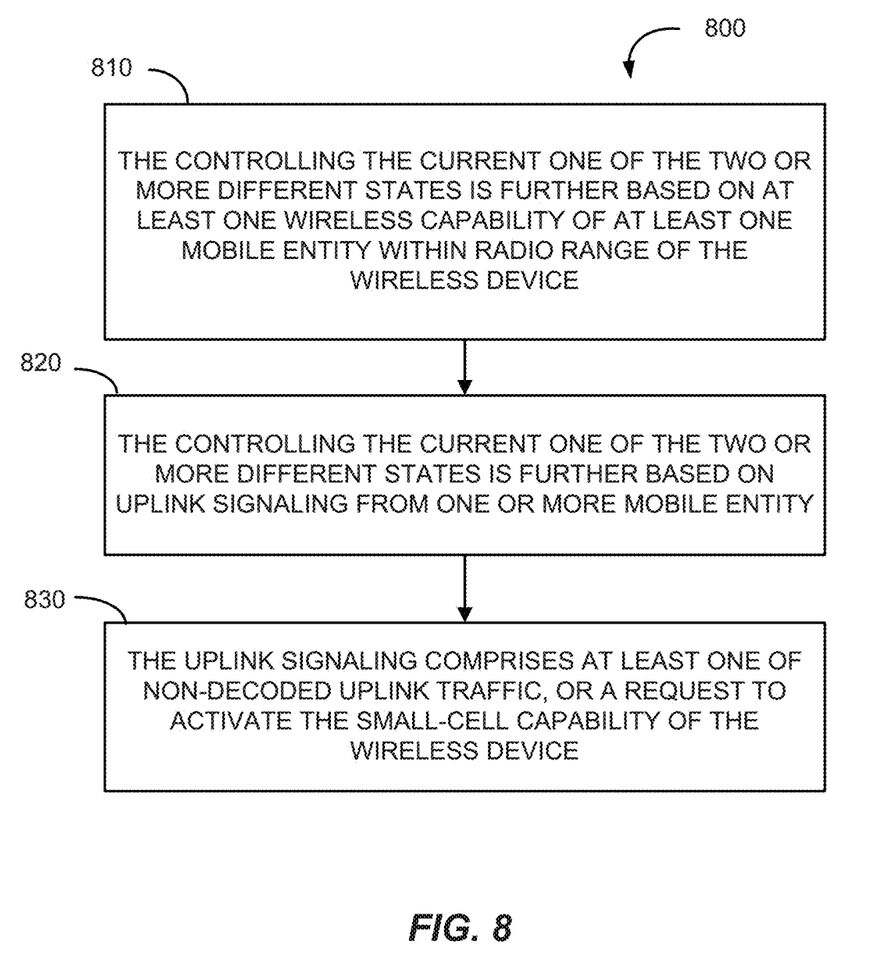

In other aspects, the method 400 may include one or more of the additional operations 800, shown in FIG. 8. The method 400 may further include, at 810, controlling the current one of the two or more different states further based on at least one wireless capability of at least one mobile entity within radio range of the wireless device. For example, a decision may be made to activate the small cell capability if the radio access technology provided would be appropriate, or more appropriate than alternatives, for the mobile entity. In the alternative, or in addition, controlling the current one of the two or more different states may be further based, at 820, on uplink signaling from one or more mobile entity. In an aspect, the uplink signaling may include, at 830, at least one of non-decoded uplink traffic, or a request to activate the small-cell capability of the wireless device. The wireless device receiving the uplink signaling may activate itself autonomously, or may provide an indication that it has received uplink signaling to a network control node, which may make the activation/deactivation determination and provide an activation signal to the wireless device.

Figure 9:
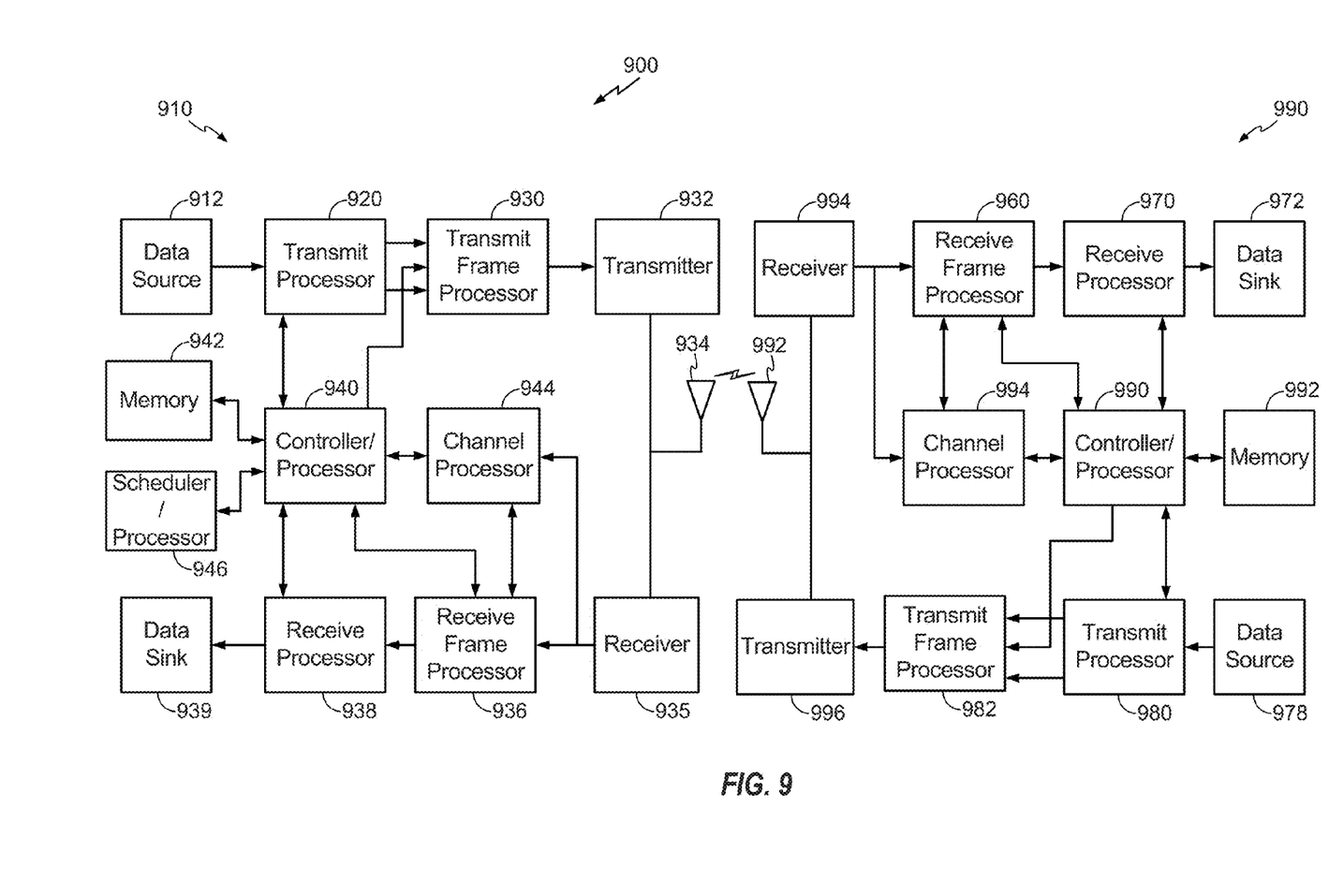
FIG. 9 is a block diagram illustrating aspects of a Node B in communication with a UE in a telecommunications system, wherein the Node B is configured for operating as a portable multipurpose wireless device with a small cell capability that is selectively activated based on location or other factors.

FIG. 9 is a block diagram of a Node B 910 in communication with a UE 950 (e.g., mobile entity), where the Node B 910 may be a multifunctional wireless device when activated as small cell, such as node 102 in FIG. 1 or similar network entity. The UE 950 may communicate with the Node B as a connected terminal, or to request activation of a device in a latent state, or for other uplink signaling.

In the downlink communication, a transmit processor 970 may receive data from a data source 912 and control signals from a controller/processor 940. The transmit processor 970 provides various signal processing functions for the data and control signals, as well as reference signals (e.g., pilot signals). For example, the transmit processor 970 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 970. These channel estimates may be derived from a reference signal transmitted by the UE 950 or from feedback from the UE 950. The symbols generated by the transmit processor 970 are provided to a transmit frame processor 980 to create a frame structure. The transmit frame processor 980 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 970 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the signal transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA7000, Evolution-Data Optimized (EV-DO), Ultra Mobile Broadband (UMB), IEEE 802.11 (Wi-Fi), IEEE 802.16 (WiMAX), IEEE 802.70, Ultra-Wideband (UWB), Bluetooth, and/or other suitable systems. The actual telecommunication standard, network architecture, and/or communication standard employed will depend on the specific application and the overall design constraints imposed on the system.

Figure 10:
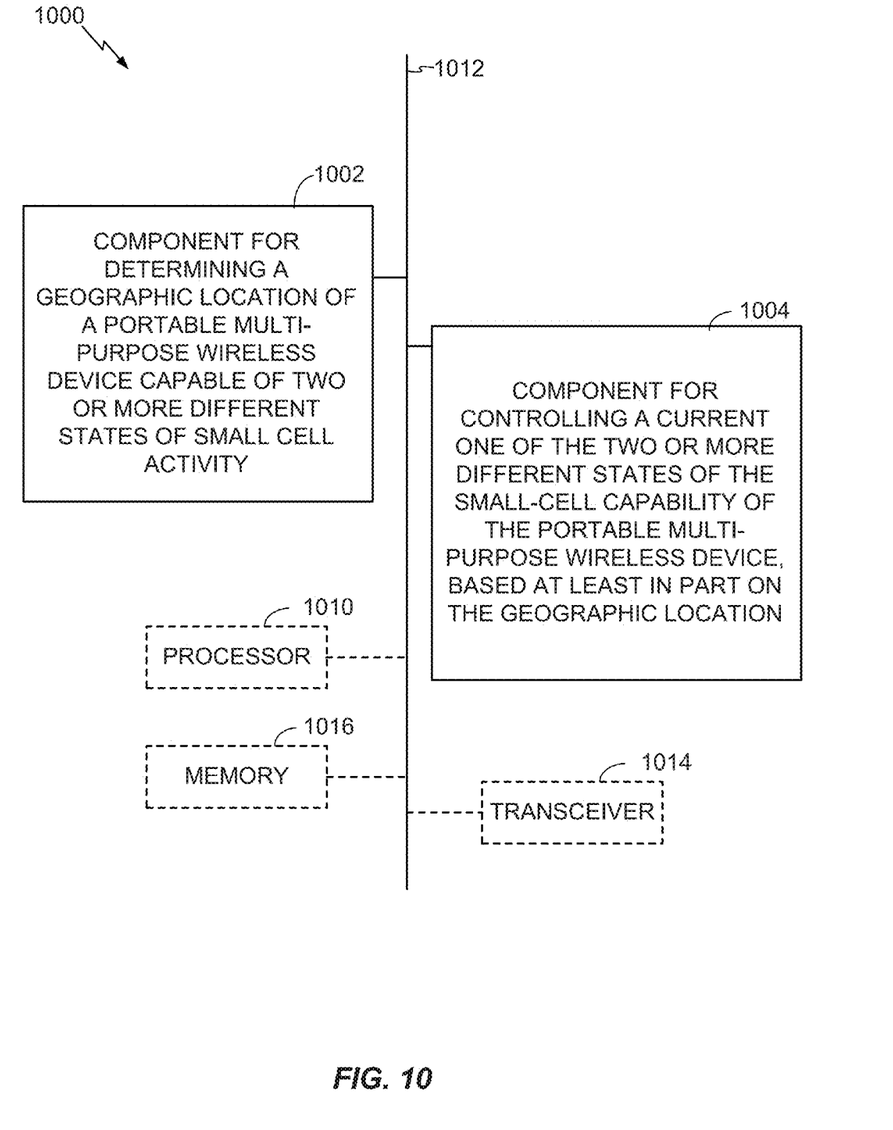
FIG. 10 is a block diagram illustrating further aspects of an apparatus configured for controlling activation or deactivation of a small cell capability of a portable multi-purpose wireless device in a wireless communications network.

For further example, with reference to FIG. 10, there is depicted an apparatus 1000 that may be configured as a portable multi-function wireless device capable of being configured as a small cell in a wireless network and/or a network entity in communication with the wireless device, or as a processor or similar device for use within wireless device and/or network entity. The apparatus 1000 may include functional blocks that can represent functions implemented by a processor, software, hardware, or combination thereof (e.g., firmware).

As illustrated, in one embodiment, the apparatus 1000 may include an electrical component or module 1002 for determining a geographic location of a portable multi-purpose wireless device capable of two or more different states of small cell activity. For example, the electrical component 1002 may include at least one control processor coupled to a transceiver or the like and to a memory with instructions for determining the geographic location. The component 1002 may be, or may include, a means for determining a geographic location of a portable multi-purpose wireless device capable of two or more different states of small cell activity. Said means may include the control processor executing any one or more of algorithms, for example, establishing a communication link to the portable multi-purpose wireless device capable of two or more different states of small cell activity, instructing the wireless device to take macro cell and/or GPS signal measurements, receiving a report of macro cell identifiers or GPS coordinates from the device, and determining location information from the coordinates or cell identifiers.

The apparatus 1000 may include an electrical component 1004 for controlling a current one of the two or more different states of the small-cell capability of the portable multi-purpose wireless device, based at least in part on the geographic location. For example, the electrical component 1004 may include at least one control processor coupled to a transceiver or the like and to a memory holding instructions for the controlling. The component 1004 may be, or may include, a means for controlling a current one of the two or more different states of the small-cell capability of the portable multi-purpose wireless device, based at least in part on the geographic location. Said means may include the control processor executing an algorithm, for example, receiving information indicating a present location of the wireless device, retrieving stored information defining a home region based on a device identifier, performing a geometric comparison of the home region to the present region to determine whether the device is presently located in its home region, and taking a conditional action (e.g., IF:THEN) based on whether or not the device is in its home region, including, for example, activating the portable small cell if it is located in its home region (optionally subject to other conditions).

In related aspects, the apparatus 1000 may optionally include a processor component 1010 having at least one processor, in the case of the apparatus 1000 configured as a network entity. The processor 1010, in such case, may be in operative communication with the components 1002-1004 or similar components via a bus 1012 or similar communication coupling. The processor 1010 may effect initiation and scheduling of the processes or functions performed by electrical components 1002-1004. The processor 1010 may encompass the components 1002-1004, in whole or in part. In the alternative, the processor 1010 may be separate from the components 1002-1004, which may include one or more separate processors.

In further related aspects, the apparatus 1000 may include a radio transceiver component 1014. A standalone receiver and/or standalone transmitter may be used in lieu of or in conjunction with the transceiver 1014. In the alternative, or in addition, the apparatus 1000 may include multiple transceivers or transmitter/receiver pairs, which may be used to transmit and receive on different carriers. The apparatus 1000 may optionally include a component for storing information, such as, for example, a memory device/component 1016. The computer readable medium or the memory component 1016 may be operatively coupled to the other components of the apparatus 1000 via the bus 1012 or the like. The memory component 1016 may be adapted to store computer readable instructions and data for performing the activity of the components 1002-1004, and subcomponents thereof, or the processor 1010, or the methods disclosed herein. The memory component 1016 may retain instructions for executing functions associated with the components 1002-1004. While shown as being external to the memory 1016, it is to be understood that the components 1002-1004 can exist within the memory 1016.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, such as a custom application-specific integrated circuit (ASIC), and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be implemented in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is for purpose of example, and not for limitation. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for controlling activation or deactivation of a small cell activity of a portable multi-purpose wireless device in a wireless communications network, comprising:
    determining a geographic location of a portable multi-purpose wireless device capable of three or more different states of small cell activity, wherein the three or more different states include at least an active state, an inactive state, and a latent state; and
    controlling a current one of the three or more different states of the small-cell capability of the portable multi-purpose wireless device based at least in part on the geographic location.

2. The method of claim 1, wherein the controlling the current one of the three or more different states comprises placing the small-cell capability in the active state wherein the wireless device operates as a small cell.

3. The method of claim 2, wherein the controlling the current one of the three or more different states comprises at least one of: placing the small-cell capability in the inactive state wherein the wireless device does not perform any small cell function, or causing the wireless device to change from the active state to the inactive state or from the inactive state to the active state.

4. The method of claim 3, wherein the controlling the current one of the three or more different states comprises at least one of: placing the small-cell capability in the latent state wherein the wireless device does not operate as a small cell and listens for an activation signal, or causing the wireless device to change from one of the active state or the inactive state to the latent state or from the latent state to one of the inactive state or the active state.

5. The method of claim 4, wherein the wireless device, when in the latent state, performs at least one of sparsely transmitting an overhead signal for detection by a mobile entity or for reporting to the wireless communication network, advertising its presence using OOB signaling, listening to OOB signaling, or listening for an activation request.

6. The method of claim 1, wherein the controlling the current one of the three or more different states is further based on whether the wireless device is located in a defined home region.

7. The method of claim 6, further comprising determining whether the wireless device is located in a defined home region based on least one of a macro cell neighborhood detected by the wireless device, or on Global Positioning System (GPS) coordinates detected by the wireless device.

8. The method of claim 1, wherein the controlling the current one of the three or more different states is further based on at least one of demand or load factors of the wireless communication network.

9. The method of claim 1, wherein the controlling the current one of the three or more different states is further based on one or more locations of at least one additional portable multi-purpose wireless device capable of three or more different states of small cell activity.

10. The method of claim 1, wherein the controlling the current one of the three or more different states is further based on at least one power source status of the wireless device and at least one additional portable multi-purpose wireless device capable of three or more different states of small cell activity.

11. The method of claim 1, wherein the controlling the current one of the three or more different states is further based on at least one of an available radio access technology, backhaul availability, or backhaul quality of the wireless device and at least one additional portable multi-purpose wireless device capable of three or more different states of small cell activity.

12. The method of claim 1, wherein the controlling the current one of the three or more different states is further based on at least one wireless capability of at least one mobile entity within radio range of the wireless device.

13. The method of claim 1, wherein the controlling the current one of the three or more different states is further based on uplink signaling from one or more mobile entities.

14. The method of claim 13, wherein the uplink signaling comprises at least one of non-decoded uplink traffic, or a request to activate the small-cell capability of the wireless device.

15. An apparatus for controlling activation or deactivation of a small cell activity of a portable multi-purpose wireless device in a wireless communications network, comprising a memory coupled to at least one processor, wherein the at least one processor is configured to:
determine a geographic location of a portable multi-purpose wireless device capable of three or more different states of small cell activity, wherein the three or more different states include at least an active state, an inactive state, and a latent state; and
control a current one of the three or more different states of the small-cell capability of the portable multi-purpose wireless device based at least in part on the geographic location.

16. The apparatus of claim 15, wherein the at least one processor is configured to control the current one of the three or more different states at least in part by placing the small-cell capability in the active state wherein the wireless device operates as a small cell.

17. The apparatus of claim 16, wherein the at least one processor is configured to control the current one of the three or more different states at least in part by one of more of: placing the small-cell capability in the inactive state wherein the wireless device does not perform any small cell function, or causing the wireless device to change from one of the active state or the inactive state to the latent state or from the latent state to one of the inactive state or the active state.

18. The apparatus of claim 17, wherein the at least one processor is configured to control the current one of the three or more different states at least in part by one or more of: placing the small-cell capability in the latent state wherein the wireless device does not operate as a small cell and listens for an activation signal, or causing the wireless device to change from one of the active state or the inactive state to the latent state or from the latent state to one of the inactive state or the active state.

19. The apparatus of claim 18, wherein the at least one processor is configured to the wireless device, when in the latent state, performing at least one of sparsely transmitting an overhead signal for detection by a mobile entity or for reporting to the wireless communication network, advertising its presence using OOB signaling, listening to OOB signaling, or listening for an activation request.

20. The apparatus of claim 15, control the current one of the three or more different states further based on whether the wireless device is located in a defined home region.

21. The apparatus of claim 20, wherein the at least one processor is configured to determine whether the wireless device is located in the defined home region based on least one of a macro cell neighborhood detected by the wireless device, or on Global Positioning System (GPS) coordinates detected by the wireless device.

22. The apparatus of claim 15, wherein the at least one processor is configured to control the current one of the three or more different states at least in part on at least one of demand or load factors of the wireless communication network.

23. The apparatus of claim 15, wherein the at least one processor is configured to the control the current one of the three or more different states at least in part on one or more locations of at least one additional portable multi-purpose wireless device.

24. The apparatus of claim 15, wherein the at least one processor is configured to the control the current one of the three or more different states at least in part on at least one power source status of the wireless device and at least one additional portable multi-purpose wireless device.

25. The apparatus of claim 15, wherein the at least one processor is configured to the control the current one of the three or more different states based on at least one of an available radio access technology, backhaul availability, or backhaul quality of the wireless device and at least one additional portable multi-purpose wireless device.

26. The apparatus of claim 15, wherein the at least one processor is configured to control the current one of the three or more different states is further based on at least one wireless capability of at least one mobile entity within radio range of the wireless device.

27. The apparatus of claim 15, wherein the at least one processor is configured to the control the current one of the three or more different states based on uplink signaling from one or more mobile entity.

28. The apparatus of claim 27, wherein the at least one processor is configured to process the uplink signaling including at least one of non-decoded uplink traffic, or a request to activate the small-cell capability of the wireless device.

29. A non-transitory computer-readable medium storing computer executable code for controlling activation or deactivation of a small cell activity of a portable multi-purpose wireless device in a wireless communications network, comprising:
code for determining a geographic location of a portable multi-purpose wireless device capable of three or more different states of small cell activity, wherein the three or more different states include at least an active state, an inactive state, and a latent state; and
code for controlling a current one of the three or more different states of the small-cell capability of the portable multi-purpose wireless device based at least in part on the geographic location.

30. An apparatus for controlling activation or deactivation of a small cell activity of a portable multi-purpose wireless device in a wireless communications network, the apparatus comprising:
means for determining a geographic location of a portable multi-purpose wireless device capable of three or more different states of small cell activity, wherein the three or more different states include at least an active state, an inactive state, and a latent state; and
means for controlling a current one of the three or more different states of the small-cell capability of the portable multi-purpose wireless device based at least in part on the geographic location.

* * * * *